Jan. 5, 1954        B. KRALOWETZ        2,664,617
CUTTING TOOL ASSEMBLY
Filed April 29, 1952        2 Sheets-Sheet 2
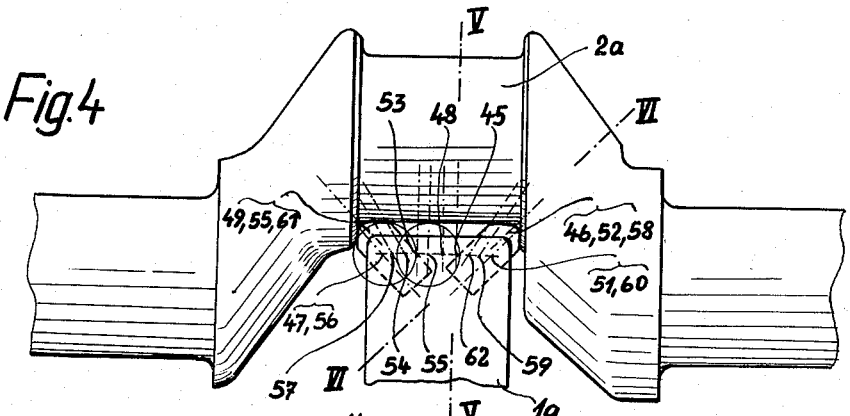
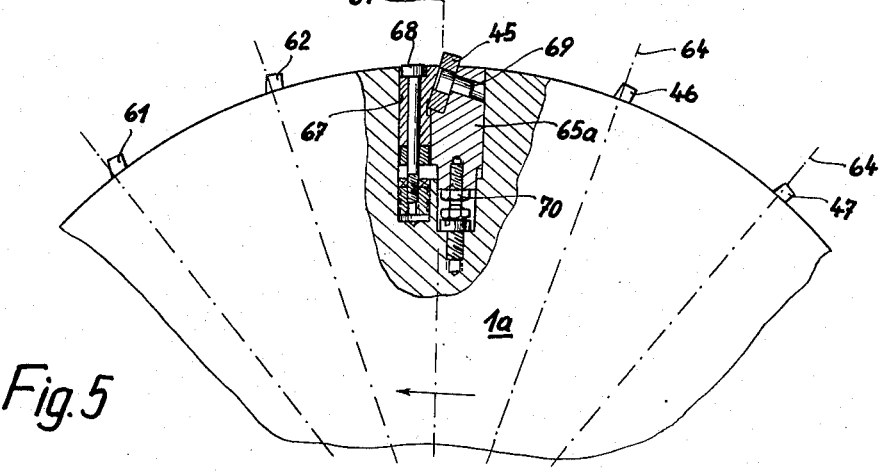
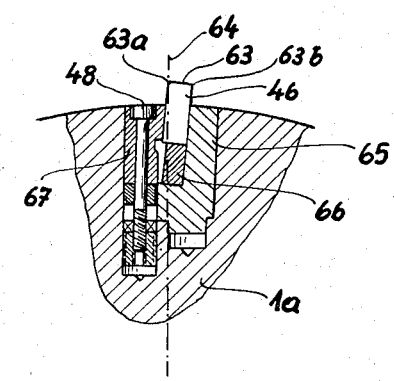
Inventor
Bruno Kralowetz
By Robert E. Burns
Attorney Patented Jan. 5, 1954

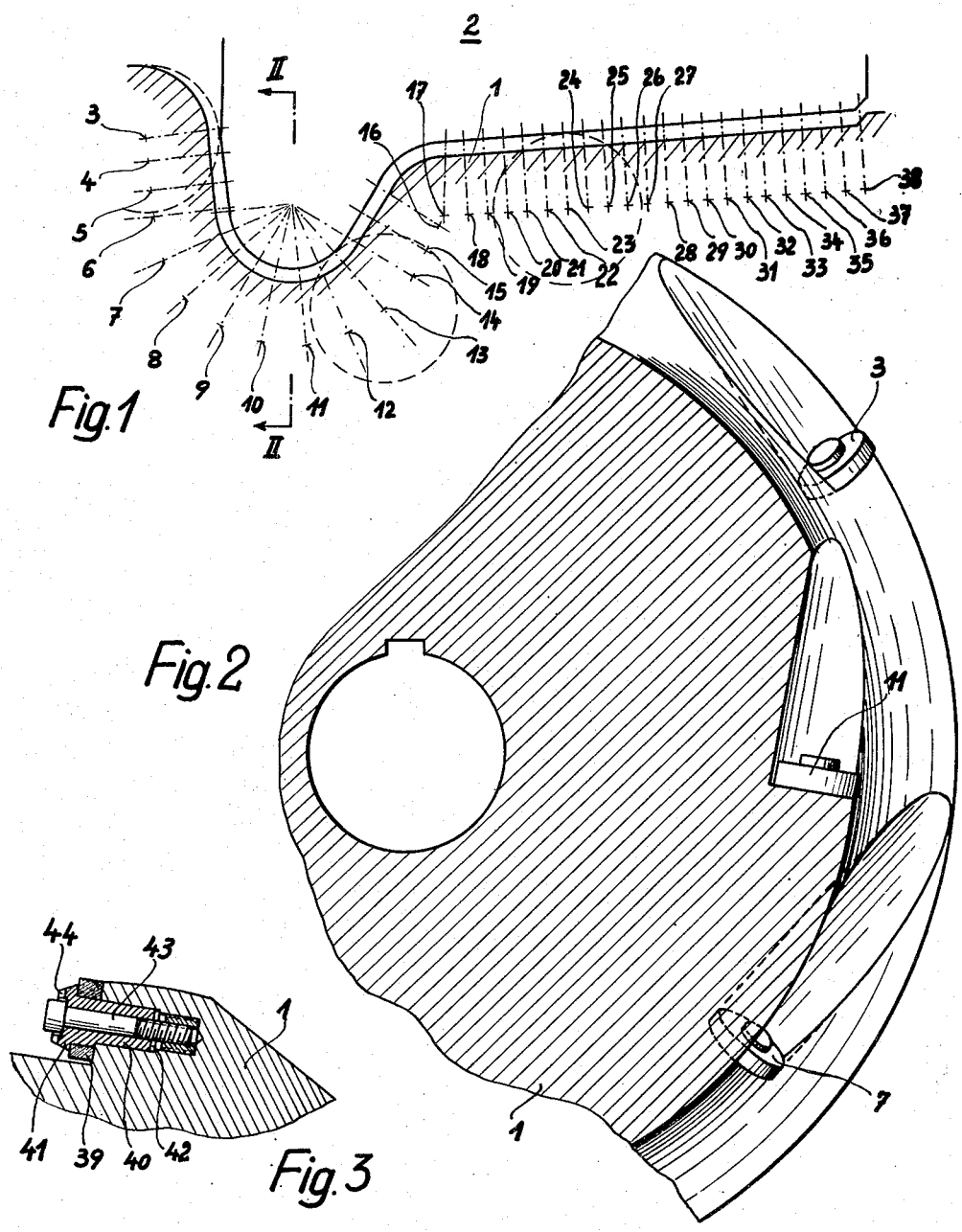

2,664,617

UNITED STATES PATENT OFFICE 2,664,617

CUTTING TOOL ASSEMBLY

Bruno Kralowetz, Steyr, Austria, assignor to August Saxer, Thawil, Switzerland

Application April 29, 1952, Serial No. 284,850

Claims priority, application Austria December 3, 1951

12 Claims. (Cl. 29—105)

This invention relates to a cutting tool assembly, in particular to a profile milling cutter.

Profile milling cutters are known, which comprise a cutter head and cemented-carbide teeth exchangeably inserted therein and distributed over the periphery and breadth of the head with different radii in correspondence with the desired profile. These cemented-carbide teeth are similar to lathe tools and differ from each other or have differently shaped cutting edges in accordance with the desired profile. Thus several teeth of different, definite shape are required. This makes replacing the teeth difficult and involves high tool cost. Moreover, the lathe-tool-like teeth must always be reground and newly set when they have become blunt or when their cutting edge portion has been damaged. This is complicated and time-consuming. Furthermore, when the cutting edge crumbles off at a point the whole cutting edge must be reground to the depth of the crumbled-off part. This is inefficient and involves high tool consumption.

It is an object of the invention to eliminate these disadvantages and to provide a profile milling cutter which consists of a cutter head and replaceably inserted cemented-carbide teeth, and in which all, or at least the majority of the teeth are identical, impact and shock stressing of these teeth being avoided almost completely and the number of times when, and the depth to which the teeth must be reground, as well as the resulting setting work, being reduced to a minimum.

Essentially the invention provides a cutter head set in a close, overlapping distribution in the direction of its breadth with a plurality of identical, circular or polygonal disk teeth, which in the known manner are inserted transversely to the direction of rotation of the cutter head and are rotatably adjustable, the disk teeth which in accordance with the profile cut with a peripheral part arranged laterally in respect of the direction of rotation being inclined in respect of the direction of rotation of the cutter head, to obtain equal cutting and clearance angles, respectively, for all disk teeth.

Thus it is a feature of the invention to provide a profile milling cutter comprising a cutter head, a plurality of identical, polygonal, cemented-carbide, disk teeth spaced in the peripheral direction of the cutter head and overlapping in the direction of the breadth of the cutter head so that each of said disk teeth has a cutting edge portion corresponding to a portion of the profile to be milled, the cutting edge portions of said disk teeth having equal cutting and clearance angles, respectively, part of said disk teeth having said cutting edge portion arranged laterally in respect of the peripheral direction of the cutter head and being laterally inclined in respect of said peripheral direction, mounting means to mount said disk teeth in said cutter head with freedom of rotation, and means to set each of said disk teeth in different positions relative to said mounting means.

The significant advantages of disk teeth as such over the lathe-tool-like cemented-carbide teeth are known and consist in that regrinding is not necessary immediately when the cutting part of the edge becomes blunt because the disk tooth may be turned correspondingly, and that a broken-out cutting edge portion can be taken into consideration in tool setting so that regrinding of the whole cutting edge to the entire depth of the portion crumbled off is eliminated. For this reason, end and plain milling cutters have been suggested already which consist of a cutter head with circular or polygonal disk teeth inserted in accurate alignment in the direction of rotation. Previously the setting of profile milling cutter heads with such disk teeth has been disregarded owing to the fact that only an arc or a circle may be cut with a single circular tooth and only a straight line may be cut with a straight edge of a polygon, whereas they are not suitable for cutting any other profile desired.

The invention is based on the idea that almost every profile may be considered the envelope of circles or may be substituted by arranging short chords one behind the other, and that the circles or polygons themselves when arranged closely enough or having short sides involve only slight deviations from the required profile, said deviations being negligible in many workpieces.

This close arrangement of circles along the profile involves in practice the construction of a cutter head having a plurality of teeth and can be provided without difficulty where disk teeth are used, because the circular cutting edge initially contacts the workpiece at one point only, the width and with it the cross-sectional area of the cutting beginning with zero and increasing subsequently. The maximum width of the cutting is obtained only when the tooth comes out of the material; then the depth and with it the cross-sectional area of the cutting is zero. Hence, instead of the shock stress encountered by lathe-tool-like teeth a swelling load on the teeth and cutter head is obtained so that several teeth may cut simultaneously without affecting the steadiness of the cutting edges, provided that the machine is of rigid construction.

In addition to the favorable properties resulting from the use of disk teeth as such, the profile milling cutter according to the invention has the advantage that identical teeth are provided. This facilitates the exchange or substitution of the teeth and involves a considerable cut in tool cost in general. The size of the projections or irregularities in the profile of the workpiece may be reduced sufficiently without difficulty. E. g., a profile milling cutter for the circular milling of treads of rolling stock leaves on the workpiece projections of only 0.1 mm. to 0.3 mm., quite permissible in this case (the projections extend along the periphery).

Depending on the shape of the desired profile not all of the teeth cut with the front part of the peripheral edge in respect of the direction of rotation of the cutter head (as in the case of plain milling cutters) because the teeth shaping projections or reentrant portions cut with a more or less lateral edge portion. As a result different cutting and clearance angles, respectively, would result were all disk teeth arranged normal to the direction of rotation (the teeth lie in a plane parallel with the axis of the cutter head, as in plain milling cutters). It would be necessary to compensate these differences by grinding the individual teeth to different sections. To enable the use of identical teeth, not ground to different sections, the teeth are inserted in the cutter head with different, though relatively slight inclinations in respect of the direction of rotation.

A particularly favorable construction and mounting of the teeth is achieved in accordance with the invention thereby that the disk teeth consist of a cemented-carbide ring each, which is rotatably mounted and may be set on an eccentric bushing, which is inserted in the cutter head and rotatably adjustable therein. When a cutting edge portion is blunt or damaged, the cemented-carbide ring may be turned on the bushing sufficiently to move a new edge portion into cutting position, without requiring regrinding or resetting. When the whole ring has been reground, with a resulting reduction in disk diameter, only the eccentric bushing needs to be turned to compensate the reduction in diameter of the cemented-carbide ring resulting from the grinding so that the disk tooth is again set with its cutting edge in correspondence with the milling cutter diameter required. This simple adjustment of teeth cannot be employed in plain milling cutters because a turning of the eccentric bushing involves a lateral displacement of the disk tooth parallel to the axis of the cutter head so that the tooth would protrude out of the row of the other teeth and would have to perform roughing work alone. In the profile milling cutter according to the invention, however, this small lateral displacement is insignificant.

Moreover, in accordance with the invention, the disk teeth consisting of the cemented-carbide rings are symmetric in respect of the central plane normal to their axis. This enables the reversal of the teeth and the use of both peripheral edges as cutting edges whereby the service life of the tooth until regrinding is necessary, and with it the entire life of the tooth, is doubled.

Since the disk teeth must have a certain minimum diameter to permit of fixing, adjusting, and regrinding them and owing to the fact that the total number of such teeth is limited by the size of the cutter head, etc., they cannot be used to machine concave portions having a radius of curvature less than the disk minimum radius, as are found, e. g., in a crankshaft at the transition between the crankpin and crankweb.

In further development of the invention a profile milling cutter suitable for the circular milling of crankpins or the like is provided in which for machining concave portions having a small radius of curvature the cutter head has inserted therein additional, lathe-tool-like, cemented-carbide, profile teeth, which are adjustable or exchangeable therein, and the longitudinal axis of which preferably lies in the axis of angular symmetry of the concave portion. Thus such a profile milling cutter is suitable for milling in one operation the crankpin, the crankwebs, and the intermediate concave portions, mutually identical disk teeth being provided for the crankpins and the crankwebs, whereas profile teeth are provided only for the concave portions so that the advantages of the disk-toothed milling cutter are retained.

These profile teeth have the shape of a right prism ground on two surfaces normal to the two wider sides, and are inserted in the cutter head with a slight inclination in respect of the respective radial plane. Thus two equal cutting edges are obtained so that when one of them becomes blunt the profile teeth also need to be reversed only to be ready for use again immediately. This doubles the service life also of these tools until regrinding becomes necessary. The inclination of the teeth provides for the necessary cutting and clearance angles.

A most simple and suitable mounting and setting of the profile teeth in the cutter head is enabled when the profile teeth are supported in the cutter head by an exchangeable fitting piece, and may be fixed in position by means of a wedge, which may be tightened by a screw. It is also possible, of course, to provide an adjustable setting screw or the like to support the profile tooth.

Often the workpiece has different machining allowances at different parts of its profile, or different quantities of material are to be removed from different parts of the profile. E. g., in a crankshaft, much more material must be removed from the webs and the concave portions than from the cylindric pin. This involves a differential wear of the teeth cutting from the different parts of the profile, with resulting differences in edge life. To avoid this the invention provides different numbers of teeth, whether disk or profile, in the several peripheral circles of the cutter head, in which circles the teeth are arranged to cut the same part of the profile, said numbers of teeth in said circles differing in dependence of the quantity of material to be removed from said different parts of the profile. Thus each tooth must remove approximately the same quantity of material and will be subjected to the same wear so that the edge life of the milling cutter until regrinding of the teeth becomes necessary is greatly prolonged. This is another advantage of the milling cutter according to the invention as compared with profile milling cutters having continuous cutting edges extending across the profile. Those cutting edges must be reground in their entire length, of course, and will wear more heavily and more rapidly at the parts having a larger allowance of material than at the other parts so that regrinding becomes necessary even when the parts cutting a smaller allowance of material are not blunt yet. This is most uneconomical.

Thus it is a feature of the invention to provide a process of shaping a workpiece by removing different quantities of material from different parts thereof, which process comprises performing simultaneously a number of individual cutting operations on each of said parts, the number of said individual cutting operations performed on a part where a relatively large quantity of material is to be removed exceeding the number of said individual cutting operations performed on a part where a relatively small quantity of material is to be removed.

Another feature of the invention resides in providing a tool assembly for shaping a workpiece by removing different quantities of material from different parts thereof, said tool assembly comprising a number of individual tools arranged to cut each of said parts, the number of individual tools thus arranged to cut a part where a relatively large quantity of material is to be removed exceeding the number of tools thus arranged to cut a part where a relatively small quantity of material is to be removed.

A still further feature of the invention is to provide an inserted-tooth cutter for milling a profile by removing different thicknesses of material from different parts of a workpiece, said cutter comprising a cutter head, and a number of teeth aligned in the peripheral direction of said cutter head to cut each of said parts, the number of teeth thus aligned to cut a part where a relatively large thickness of material is to be removed exceeding the number of teeth thus aligned to cut a part where a relatively small thickness of material is to be removed, said teeth comprising a plurality of identical, polygonal, cemented-carbide, disk teeth spaced in the peripheral direction of the cutter head and overlapping in the direction of the breadth of the cutter head so that each of said disk teeth has a cutting-edge portion corresponding to a portion of the profile to be milled, the cutting edge portions of said disk teeth having equal cutting and clearance angles, respectively, mounting means to mount said disk teeth in the cutter head with freedom of rotation, and means to set each of said disk teeth in different positions relative to said mounting means.

The invention is illustrated by way of example in the accompanying drawings, in which Fig. 1 is an enlarged diagrammatic view showing the distribution of the disk teeth across the breadth of the cutter head of a profile milling cutter for the manufacture of treads of rolling stock.

Fig. 2 is a partial, cross-sectional view of the cutter head, taken along line II—II of Fig. 1, and Fig. 3 shows as a detail the mounting of a disk tooth in the cutter head.

Fig. 4 shows diagrammatically the distribution of the teeth across the breadth of the cutter head in a profile milling cutter used for the circular milling of crankshaft pins, and Figs. 5 and 6 are sectional views taken along line V—V and VI—VI, respectively, of Fig. 4, and showing the mounting of a disk tooth and a profile tooth in such cutter head.

A cutter head 1, the base form of which corresponds to the negative of the tread profile 2 of a rolling-stock wheel, has inserted in it a plurality of identical disk teeth 3—38 (most of which are indicated in Fig. 1 only by their center lines or centers). These teeth are distributed across the breadth of the cutter head so that the profile line of the tread envelops the circular disks, the deviations from the profile (projections) remaining on the workpiece not exceeding the admissible limits. The disk teeth are not arranged along a generatrix of the cutter head, of course, but are distributed over the periphery thereof. The teeth 10, 11, and 18 to 38 cut with their front peripheral portion in respect of the direction of rotation of the cutter head; for this reason they are set normal to that direction and lie in a plane parallel to the axis of the cutter head. On the other hand, the teeth 3 to 9 and 12 to 17, machining the sides of the tread, cut with a peripheral portion which is more or less lateral in respect of the direction of rotation, and are inserted with different inclinations in respect of the direction of rotation (they lie in a plane intersecting with the axis of the cutter head) to obtain equal cutting and clearance angles, respectively, with identical disks everywhere. These different inclinations (teeth 3, 7) as contrasted with the normal position (tooth 11) may be seen also from Fig. 2. The teeth are fixed at the bottom of a cylindric recess in the cutter head and protrude with the corresponding part of their peripheral edge (cutting edge) over the periphery of the cutter head.

In accordance with Fig. 3 the disk body consists of a cemented-carbide ring 39 mounted eccentrically on a bushing 40, which has a collar 41 overlapping the end face of the ring, and which is rotatably inserted in a bore 42 of the cutter head. The bushing 40, and with it the cemented-carbide ring 39, are held and fixed by a stud bolt 43. When the stud bolt is loose, the cemented-carbide ring may be turned to bring a new edge portion into cutting position. When the bushing is turned—to this end a radial slot 44 is provided in its end face—the cemented-carbide ring owing to its eccentric mounting will be displaced in respect of the radius of the cutter head or milling cutter (setting of the tool after regrinding has reduced the ring diameter).

The ring 39 is of symmetric section in respect of the center plane normal to its axis. In the simplest case it is of rectangular or square cross section so that it may be inserted in a reversed position and both its peripheral edges may be used for cutting.

In accordance with Figs. 4 to 6, the cutter head 1a, serving for the circular milling of a crankshaft pin 2a, has inserted therein in a regular distribution over its periphery eighteen cemented-carbide teeth 45 to 62, of which the teeth 46, 49, 52, 55, 58, and 61 are lathe-tool-like profile teeth and the others are mutually identical disk teeth. The teeth are so distributed over the breadth of the cutter head that the profile of the crankpin and of the adjacent webs envelop the circular disks, whereas the two concave surfaces between the webs and crankpins, having a radius of curvature smaller than the disk radius, are machined by the profile teeth (as in Fig. 1 most of the disk teeth are indicated only by their centers or center lines). The longitudinal axis of the profile teeth lies in the axis of angular symmetry of the concave portions.

Since much more material must be removed from the hollow portions and webs than from the crankpin, sets of three profile teeth 49, 55, 61, and 46, 52, 58, and sets of two laterally cutting disk teeth 47, 56, and 51, 60, are provided the teeth of each of said sets being accurately aligned to cut at the same point of the profile. For each of the other parts to be cut (along the crankpin) only one disk tooth is provided.

The profile teeth have the shape of a right prism and their ground surfaces 63 are normal to the two wider side faces. Thus two identical cutting edges 63a, 63b are obtained, which by a reversal of the tooth may be used alternatively for cutting whereby the service life of the tooth until regrinding becomes necessary is doubled. To provide for the necessary cutting and clearance angles the teeth are inserted in the cutter head 1a with a slight inclination relative to the respective radial plane 64.

In correspondingly inclined bores the cutter head 1a has inserted guide or receiving bodies 65, at the step of which the profile teeth are supported with an exchangeable fitting piece 66 interposed. A wedge 67 is inserted in the cutter head 1a adjacent to each profile tooth for fixing the same, and may be tightened by means of a screw 68 connected to the wedge and cutter head and operable to move the wedge relative to the profile tooth. The profile teeth may be removed when the wedges 67 are loose. The resetting of the teeth necessary after regrinding is possible by an exchange of the fitting pieces 66.

In this case the disk teeth are rotatably supported on pins 69 inserted into the receiving bodies 65a and are also fixed by identical wedges 67 with screws 68. To reset the reground teeth the respective receiving bodies 65a have an adjusting screw 70, with which they are supported in the cutter head.

As used in the appended claims, the term "polygonal" includes the meaning of "circular," a circle being considered a polygon having an infinite number of angles.

I claim:

1. A profile milling cutter comprising a cutter head, a plurality of identical, polygonal, cemented-carbide disk teeth spaced in the peripheral direction of the cutter head and overlapping in the direction of the breadth of the cutter head so that each of said disk teeth has a cutting edge portion corresponding to a portion of the profile to be milled, the cutting edge portions of said disk teeth having equal cutting and clearance angles, respectively, part of said disk teeth having their cutting edge portion arranged normal to the peripheral direction of the cutter head and part of said disk teeth having said cutting edge portion arranged laterally in respect of the peripheral direction of the cutter head and being laterally inclined in respect of said peripheral direction, mounting means to mount said disk teeth in said cutter head with freedom of rotation, and means to set each of said disk teeth in different positions relative to said mounting means.

2. A profile milling cutter comprising a cutter head and a plurality of disk teeth spaced in the peripheral direction of the cutter head and overlapping in the direction of the breadth of the cutter head so that each of said disk teeth has a cutting edge portion corresponding to a portion of the profile to be milled, the cutting edge portions of said disk teeth having equal cutting and clearance angles, respectively, each of said disk teeth comprising an eccentric bearing bushing rotatably mounted in the cutter head, a cemented-carbide ring rotatably mounted on said eccentric bushing, and means to set said ring in different positions relative to the eccentric bushing and to set said eccentric bushing in different positions relative to said cutter head, part of said disk teeth having said cutting edge portion arranged laterally in respect of the peripheral direction of the cutter head and being laterally inclined in respect of said peripheral direction.

3. A profile milling cutter comprising a cutter head, a plurality of identical, polygonal, cemented-carbide disk teeth spaced in the peripheral direction of the cutter head and overlapping in the direction of the breadth of the cutter head so that each of said disk teeth has a cutting edge portion corresponding to a portion of the profile to be milled, the cutting edge portions of said disk teeth having equal cutting and clearance angles, respectively, part of said disk teeth having their cutting edge portion arranged normal to the peripheral direction of the cutter head and part of said disk teeth having said cutting edge portion arranged laterally in respect of the peripheral direction of the cutter head and being laterally inclined in respect of said peripheral direction, each of said disk teeth being symmetric in respect of the center plane normal to its axis, mounting means to mount said disk teeth in said cutter head with freedom of rotation, and means to set each of said teeth in different positions relative to said mounting means.

4. A profile milling cutter comprising a cutter head, a plurality of identical, polygonal, cemented-carbide disk teeth spaced in the peripheral direction of the cutter head and overlapping in the direction of the breadth of the cutter head so that each of said disk teeth has a cutting edge portion corresponding to a portion of the profile to be milled, the cutting edge portions of said disk teeth having equal cutting and clearance angles, respectively, part of said disk teeth being arranged to cut with the outer portions of their peripheries and having their cutting edge portions arranged normal to the peripheral direction of rotation of the cutter head and part of said disk teeth having said cutting edge portion arranged laterally in respect of the peripheral direction of the cutter head and being laterally inclined in respect of said peripheral direction, mounting means to mount said disk teeth in said cutter head with freedom of rotation, means for moving each of said disk teeth outwardly away from the axis of rotation of said cutter, means to set each of said disk teeth in different positions relative to said mounting means, lathe-tool-like, cemented-carbide profile teeth removably and adjustably inserted in the cutter head and having cutting edges arranged to cut concave portions, and means to set said profile teeth in different positions relative to the cutter head.

5. A profile milling cutter comprising a cutter head, a plurality of identical, polygonal, cemented-carbide disk teeth spaced in the peripheral direction of the cutter head and overlapping in the direction of the breadth of the cutter head so that each of said disk teeth has a cutting edge portion corresponding to a portion of the profile to be milled, the cutting edge portions of said disk teeth having equal cutting and clearance angles, respectively, part of said disk teeth being arranged to cut with the outer portions of their peripheries and having their cutting edge portions arranged normal to the peripheral direction of rotation of the cutter head and part of said disk teeth having said cutting edge portion arranged laterally in respect of the peripheral direction of the cutter head and being laterally inclined in respect of said peripheral direction, mounting means to mount said disk teeth in said cutter head with freedom of rotation, means for moving each of said disk teeth outwardly away from the axis of rotation of said cutter, means to set each of said disk teeth in different positions relative to said mounting means, lathe-tool-like, cemented-carbide profile teeth removably and adjustably inserted in the cutter head and having cutting edges arranged to cut concave portions, and means to set said profile teeth in different positions relative to the cutter head, the longitudinal axis of each of said profile teeth lying in the axis of angular symmetry of the concave portion which it is arranged to cut.

6. A profile milling cutter comprising a cutter head, a plurality of identical, polygonal, cemented-carbide disk teeth spaced in the peripheral direction of the cutter head and overlapping in the direction of the breadth of the cutter head so that each of said disk teeth has a cutting edge portion corresponding to a portion of the profile to be milled, the cutting edge portions of said disk teeth having equal cutting and clearance angles, respectively, part of said disk teeth being arranged to cut with the outer portions of their peripheries and having their cutting edge portions arranged normal to the peripheral direction of rotation of the cutter head and part of said disk teeth having said cutting edge portion arranged laterally in respect of the peripheral direction of the cutter head and being laterally inclined in respect of said peripheral direction, mounting means to mount said disk teeth in said cutter head with freedom of rotation, means for moving each of said disk teeth outwardly away from the axis of rotation of said cutter, means to set each of said disk teeth in different positions relative to said mounting means, lathe-tool-like, cemented-carbide profile teeth of the shape of a right prism having two relatively wider side faces and ground surfaces normal to said relatively wider side faces, said profile teeth being removably and adjustably mounted in the cutter head with an inclination in respect of the radial plane of the cutter head and having cutting edges arranged to cut concave portions, and means to set said profile teeth in different positions relative to the cutter head.

7. A profile milling cutter comprising a cutter head, plurality of identical, polygonal, cemented-carbide disk teeth spaced in the peripheral direction of the cutter head and overlapping in the direction of the breadth of the cutter head so that each of said disk teeth has a cutting edge portion corresponding to a portion of the profile to be milled, the cutting edge portions of said disk teeth having equal cutting and clearance angles, respectively, part of said disk teeth being arranged to cut with the outer portions of their peripheries and having their cutting edge portions arranged normal to the peripheral direction of rotation of the cutter head and part of said disk teeth having said cutting edge portion arranged laterally in respect of the peripheral direction of the cutter head and being laterally inclined in respect of said peripheral direction, mounting means to mount said disk teeth in said cutter head with freedom of rotation, means for moving each of said disk teeth outwardly away from the axis of rotation of said cutter, means to set each of said disk teeth in different positions relative to said mounting means, lathe-tool-like, cemented-carbide profile teeth removably and adjustably inserted in the cutter head and having cutting edges arranged to cut concave portions, and means to set said profile teeth in different positions relative to the cutter head and comprising a removable fitting piece interposed between each profile tooth and the cutter head, a wedge inserted into the cutter head adjacent to each profile tooth, and a screw connected to the wedge and the cutter head and operable to move the wedge relative to the profile tooth.

8. An inserted-tooth cutter for milling a profile by removing different thicknesses of material from different parts of a workpiece, said cutter comprising a cutter head and a number of teeth aligned in the peripheral direction of said cutter head to cut each of said parts, the number of teeth thus aligned to cut a part where a relatively large thickness of material is to be removed exceeding the number of teeth thus aligned to cut a part where a relatively small thickness of material is to be removed, said teeth comprising a plurality of identical, polygonal, cemented-carbide disk teeth spaced in the peripheral direction of the cutter head and overlapping in the direction of the breadth of the cutter head so that each of said disk teeth has a cutting edge portion corresponding to a portion of the profile to be milled, the cutting edge portions of said disk teeth having equal cutting and clearance angles, respectively, part of said disk teeth being arranged to cut with the outer portions of their peripheries and having their cutting edge portions arranged normal to the plane of rotation of said cutter head and part of said disk teeth being arranged to cut with laterally disposed portions of their peripheries and having their cutting edge portions inclined relative to the plane of rotation of said cutter head mounting means to mount said disk teeth in the cutter head with freedom of rotation, means for moving each of said disk teeth outwardly away from the axis of rotation of said cutter, and means to set each of said disk teeth in different positions relative to said mounting means.

9. A profile milling cutter comprising a cutter head and a plurality of disk teeth spaced in the peripheral direction of the cutter head and overlapping in the direction of the breadth of the cutter head so that each of said disk teeth has a cutting edge portion corresponding to a portion of the profile to be milled, the cutting edge portions of said disk teeth having equal cutting and clearance angles, respectively, each of said disk teeth comprising an eccentric bearing bushing rotatably mounted in the cutter head, a cemented-carbide ring rotatably mounted on said eccentric bushing, and means to set said ring in different positions relative to the eccentric bushing and to set said eccentric bushing in different positions relative to said cutter head.

10. A profile milling cutter comprising a cutter head, a plurality of identical, polygonal, cemented-carbide disk teeth spaced in the peripheral direction of the cutter head and overlapping in the direction of the breadth of the cutter head so that each of said disk teeth has a cutting edge portion corresponding to a portion of the profile to be milled, the cutting edge portions of said disk teeth having equal cutting and clearance angles, respectively, said disk teeth having said cutting edge portions arranged transversely with respect to the peripheral direction of the cutter head and different ones of said disk teeth having said cutting edge portions disposed at different angles with respect to said peripheral direction, mounting means to mount each of said disk teeth in said cutter head comprising a holder slidably mounted in a recess in said cutter head for movement toward and away from the axis of said head, means for moving said holder outwardly away from said axis, said holder having at its outer end a recess to receive said disk tooth, means for rotatably mounting said disk tooth in said recess in said holder, a wedge disposed in said recess in said head and engaging said disk tooth and means for moving said wedge inwardly toward said axis to lock said disk tooth relative to said holder and said holder relative to said head.

11. A profile milling cutter comprising a cutter head and a plurality of disk teeth spaced in the peripheral direction of the cutter head and overlapping in the direction of the breadth of the cutter head so that each of said disk teeth has a cutting edge portion corresponding to a portion of the profile to be milled, the cutting edge portions of said disk teeth having equal cutting and clearance angles, respectively, and means for mounting each of said disk teeth on said cutter head comprising a holder slidably mounted in a recess in said cutter head for movement toward and away from the axis of said head, means for moving said holder outwardly away from said axis, said holder having at its outer end a recess to receive said disk tooth, means for rotatably mounting said disk tooth in said recess in said holder, a wedge disposed in said recess in said head and engaging said disk tooth and means for moving said wedge inwardly toward said axis to lock said disk tooth relative to said holder and said holder relative to said head.

12. A profile milling cutter comprising a cutter head, a plurality of identical, polygonal, cemented-carbide disk teeth spaced in the peripheral direction of the cutter head and overlapping in the direction of the breadth of the cutter head so that each of said disk teeth has a cutting edge portion corresponding to a portion of the profile to be milled, the cutting edge portions of said disk teeth having equal cutting and clearance angles respectively, part of said disk teeth being arranged to cut with the outer portions of their peripheries and having their cutting edge portions arranged normal to the plane of rotation of said cutter head and part of said disk teeth being arranged to cut with laterally disposed portions of their peripheries and having their cutting edge portions inclined relative to the plane of rotation of said cutter head, mounting means for rotatably mounting each of said disk teeth in said cutter head, means for adjusting each of said disk teeth outwardly away from the axis of rotation of said cutter head and means for securing each of said disk teeth in different rotational and outwardly adjusted positions relative to said cutter head.

BRUNO KRALOWETZ.

References Cited in the file of this patent

UNITED STATES PATENTS

| Number | Name | Date |
|---|---|---|
| Re. 13,458 | Gorton et al. | Aug. 20, 1912 |
| 777,250 | Eynon | Dec. 13, 1904 |
| 945,623 | Sleade | Jan. 4, 1910 |
| 1,295,171 | Hunter | Feb. 25, 1919 |
| 1,460,029 | Mattson | June 26, 1923 |
| 1,495,067 | Conklin | May 20, 1924 |
| 1,978,130 | Gairing | Oct. 23, 1934 |
| 2,396,289 | Ross | Mar. 12, 1946 |
| 2,581,449 | See | Jan. 8, 1952 |
| 2,593,811 | Swinehart | Apr. 22, 1952 |
| 2,607,108 | See | Aug. 19, 1952 |
| 2,645,003 | Thompson et al. | July 14, 1953 |

FOREIGN PATENTS

| Number | Country | Date |
|---|---|---|
| 587,854 | Great Britain | May 7, 1947 |
| 24,917 | Great Britain | Oct. 31, 1912 |